US006175792B1

United States Patent
Jones et al.

(10) Patent No.: US 6,175,792 B1
(45) Date of Patent: Jan. 16, 2001

(54) APPARATUS AND METHOD FOR IMPROVING DYNAMIC RESPONSE OF AN ACTIVE ROLL CONTROL VEHICLE SUSPENSION SYSTEM

(75) Inventors: Neil Jones, Leonard; Abraham Ghaphery, Rochester Hills, both of MI (US)

(73) Assignee: TRW Inc., Lyndhurst, OH (US)

(*) Notice: Under 35 U.S.C. 154(b), the term of this patent shall be extended for 0 days.

(21) Appl. No.: 09/018,002

(22) Filed: Feb. 3, 1998

(51) Int. Cl.[7] .................................................. B60G 17/00
(52) U.S. Cl. ........................................... 701/37; 280/5.507
(58) Field of Search ................................ 701/37, 38, 40; 280/5.5, 5.507, 5.515

(56) References Cited

U.S. PATENT DOCUMENTS

| 4,206,935 | 6/1980 | Sheppard et al. . | |
|---|---|---|---|
| 4,712,807 | * 12/1987 | Kurosawa | 280/5.508 |
| 4,930,082 | * 5/1990 | Harara et al. | 701/38 |
| 4,953,089 | * 8/1990 | Wolfe | 702/142 |
| 5,060,157 | 10/1991 | Tado et al. . | |
| 5,062,658 | * 11/1991 | Majeed | 280/5.503 |
| 5,144,559 | 9/1992 | Kamimura et al. . | |
| 5,174,603 | 12/1992 | Lund . | |
| 5,229,955 | 7/1993 | Nishiwaki et al. . | |
| 5,362,094 | 11/1994 | Jensen . | |
| 5,384,705 | 1/1995 | Inagaki et al. . | |
| 5,398,184 | 3/1995 | Yamaoka et al. . | |
| 5,475,593 | 12/1995 | Townend . | |
| 5,483,446 | 1/1996 | Momose et al. . | |

(List continued on next page.)

FOREIGN PATENT DOCUMENTS 7186992  7/1995 (JP) .

OTHER PUBLICATIONS

Japanese Patent No. 0 10 67 411, published Mar. 14, 1989 (Abstract Only).

"Applying Fuzzy Logic In The Real World", by Glenn Anderson, Omron Electronics, Inc., Sensors, Sep. 1992, pp. 15–25.

"Fuzzy–logic System Solves Control Problem", by David I. Brubaker, The Huntington Group, and Cedric Sheerer, C/S Associates, EDN, Jun. 1992, pp. 121–127.

* cited by examiner

Primary Examiner—William A. Cuchlinski, Jr.
Assistant Examiner—Eric M. Gibson
(74) Attorney, Agent, or Firm—Tarolli, Sundheim, Covell, Tummino & Szabo L.L.P.

(57) ABSTRACT

An apparatus (30) and a method for providing an output signal (28) indicative of a vehicle operating parameter. Preferably, the operating parameter is lateral acceleration of the vehicle. A lateral acceleration sensor (36) senses lateral acceleration and provides a first signal (38). A lateral acceleration estimator (40) estimates lateral acceleration and provides a second signal (42). The first signal (38) is passed through filters (44, 46) to provide first signal portions (38L, 38H). The second signal (42) is passed through filters (48, 50). The first signal (38) and the filtered second signal (42H) are provided to a fuzzy logic controller (56) for analysis. The fuzzy logic controller (56) provides two fuzzy variable values ($K_1$, $K_2$) based upon the analysis. The second signal portion (38H) and the filtered second signal (42H) are multiplied by the fuzzy variables, respectively. The results of the two multiplications and the first signal portion (38L) are summed together to provide the output signal (28). Preferably, the apparatus (30) is part of an active roll control suspension system (10) and the output signal (28) is provided to a controller (24) for use in controlling force to counteract the chassis roll force.

27 Claims, 4 Drawing Sheets

U.S. PATENT DOCUMENTS

| | | |
|---|---|---|
| 5,483,448 | 1/1996 | Liubakka et al. . |
| 5,483,450 | 1/1996 | Titli et al. . |
| 5,513,108 | 4/1996 | Kishimoto et al. . |
| 5,519,611 * | 5/1996 | Tagawa et al. .................. 701/37 |
| 5,550,739 * | 8/1996 | Hoffman et al. .................. 701/37 |
| 5,557,525 | 9/1996 | Miichi et al. . |
| 5,570,287 | 10/1996 | Campbell et al. . |
| 5,570,763 | 11/1996 | Parejo . |
| 5,676,433 | 10/1997 | Inagaki et al. . |
| 5,696,677 * | 12/1997 | Leaphart et al. .................. 701/37 |
| 5,828,970 * | 10/1998 | Kimura et al. .................. 701/37 |

APPARATUS AND METHOD FOR IMPROVING DYNAMIC RESPONSE OF AN ACTIVE ROLL CONTROL VEHICLE SUSPENSION SYSTEM

TECHNICAL FIELD

The present invention is directed to active roll control for a vehicle and is particularly directed to an apparatus and method for improving the dynamic response of an active roll system.

BACKGROUND OF THE INVENTION

Vehicle suspension systems have as their goal the control of chassis motion during vehicle operation. One operating motion characteristic, which is controlled by known suspension systems, is chassis roll. A vehicle experiences chassis roll during a turning maneuver. During chassis roll, the chassis tilts or "rolls" about the vehicle's fore-to-aft axis toward an outside direction of the turn.

It is known to counteract the roll effect of the chassis by providing an opposing force to the chassis. Several methods are known to apply the opposing force. One method includes applying a chassis lifting force via corner actuators located on the vehicle side that is on the outside of the turn and/or a chassis lowering force via corner actuators located on the vehicle side that is on the inside of the turn.

Another known method is to utilize a stabilizer bar that extends laterally across the vehicle. The stabilizer bar, which is also known as a roll-control bar, acts as a torsion spring to apply the opposing force. Further, it is known to vary the opposing force that the stabilizer bar applies to the chassis. One way to vary the opposing force is to utilize and control one or more hydraulic actuators in the connection of the stabilizer bar. An example of such a system is shown in U.S. Pat. No. 5,362,094 to Jensen.

To determine the amount of roll-opposing force to be applied to the chassis, such active suspension systems require an indication of lateral acceleration to which the vehicle is subjected during the turning or cornering maneuver. In one known system, an estimated value of lateral acceleration is calculated. The lateral acceleration calculation requires a sensory input from a steerable road wheel angle sensor, a sensory input from a vehicle velocity sensor, and the value of the vehicle wheel base dimension. In one example, the road wheel angle sensor is a steering shaft angle sensor and the vehicle velocity sensor is a drive-train (e.g., transmission) sensor.

The accuracy of the calculated estimate is dependent upon the accuracy of the relationship of the road wheel angle sensor and the vehicle velocity sensor to the actual lateral acceleration being experienced by the vehicle. The signals from the road wheel angle sensor and the vehicle velocity sensor may not accurately reflect the actual lateral acceleration experienced due to terrain conditions over which the vehicle is being driven. For example, driving the vehicle on a low traction surface may result in some amount of road wheel slippage. The calculated lateral acceleration, in this wheel slippage example, would not equal the actual lateral acceleration experienced by the vehicle.

Other known systems have a physical lateral acceleration sensor mounted to the vehicle and which provides a signal indicative of sensed actual lateral acceleration. However, the signal provided by the lateral acceleration sensor may include high frequency components resulting from road noise. One solution for eradicating such high frequency noise is to digitally low-pass filter the output signal from the acceleration sensor. However, use of a low-pass filter introduces a phase lag into the control system and thereby degrades the system's performance by reducing the system's bandwidth and the system's ability to quickly respond to steering maneuvers.

SUMMARY OF THE INVENTION

The present invention includes an apparatus for providing a weighted signal indicative of acceleration of an object. Means provides a first signal indicative of object acceleration. Means calculates a weighting factor using the first signal. Means multiplies the first signal by the weighting factor to provide the weighted signal.

In accordance with another aspect, the present invention includes an apparatus for providing an output signal indicative of a vehicle operating parameter. Sensor means senses the operating parameter and provides a first signal indicative thereof. Estimator means estimates the operating parameter and provides a second signal indicative thereof. Means processes the first and second signals to provide the output signal. The means for processing includes: means for determining first and second weighting factors for the first and second signals, respectively, using at least portions of the first and second signals, means for modifying the first and second signals using the first and second weighting factors to provide first and second modified signals, and means for combining the first and second modified signals to provide the output signal.

In accordance with another aspect, the present invention includes an active roll control suspension system for controlling chassis roll of a vehicle. Force application means applies force to the chassis. Control means controls the force application means in response to at least one operating parameter signal indicative of a vehicle condition. Means provides an acceleration signal to the control means as an operating parameter signal. The means for calculating an acceleration signal includes: means for providing a first signal indicative of acceleration, means for providing a weighting factor using the first signal, means for multiplying the first signal by the weighting factor to provide a weighted signal, and means for utilizing the weighted signal as a component to provide the acceleration signal.

In accordance with another aspect, the present invention includes an active vehicle suspension system for controlling chassis roll of a vehicle. Force application means applies force to the chassis. Control means controls the force application means in response to at least one operating parameter signal indicative of a vehicle condition. Means provides the operating parameter signal to the control means. The means providing the operating parameter signal includes sensor means for sensing the operating parameter and for providing a first signal indicative thereof. The means for providing includes estimator means for estimating the operating parameter and for providing a second signal indicative thereof. The means for providing also includes means for processing the first and second signals to provide the operating parameter signal. The means for processing includes: means for determining first and second weighting factors for said first and second signals, respectively, using at least portions of the first and second signals, means for modifying the first and second signals using the first and second weighting factors to provide first and second modified signals, and means for combining the first and second modified signals.

In accordance with yet another aspect, the present invention includes a vehicle suspension control apparatus having a controllable actuator for controlling at least one suspension characteristic in response to a control signal. Means senses lateral acceleration of the vehicle and provides a sensed lateral acceleration signal indicative thereof. Means estimates lateral acceleration of the vehicle and provides an estimated lateral acceleration signal indicative thereof. Means blends the sensed lateral acceleration signal and the estimated lateral acceleration signal to provide the control signal so that the control signal is initially responsive to the estimated lateral acceleration signal and subsequently responsive to the sensed lateral acceleration signal.

In accordance with still a further aspect, the present invention includes a method for providing a weighted signal indicative of acceleration of an object. A first signal indicative of object acceleration is calculated. A weighting factor is provided using the first signal. The first signal is multiplied by the weighting factor to provide the weighted signal.

In accordance with yet a still further aspect, the present invention includes a method for providing an output signal indicative of a vehicle operating parameter. The operating parameter is sensed and a signal indicative thereof is provided. The operating parameter is estimated and a second signal indicative thereof is provided. The first and second signals are processed to provide the output signal. Processing the first and second signals includes determining first and second weighting factors for the first and second signals, respectively, using at least portions of the first and second signals. During processing, the first and second signals are modified using the first and second weighting factors to provide first and second modified signals. Also during processing, the first and second modified signals are combined.

BRIEF DESCRIPTION OF THE DRAWINGS

Further features and advantages of the present invention will become apparent to those skilled in the art to which the present invention relates from reading the following description with reference to the accompanying drawings, in which.

DESCRIPTION OF PREFERRED EMBODIMENT

Figure 1:
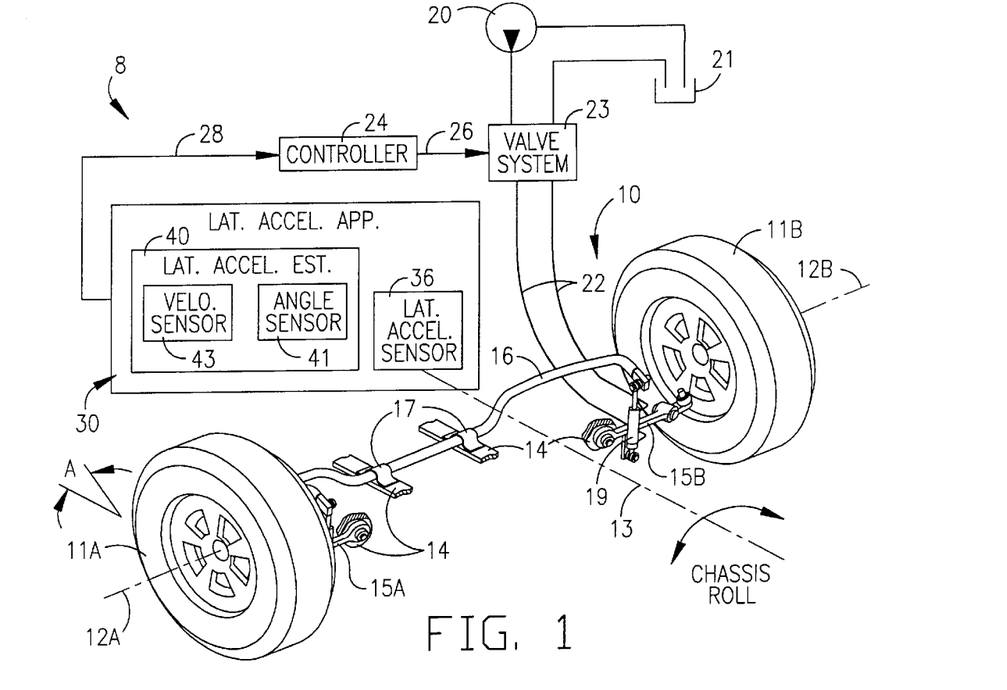
FIG. 1 is a schematic illustration of a portion of a vehicle having an active roll control system in accordance with the present invention.

Referring to FIG. 1, a portion of a vehicle 8 that has an active roll control suspension system 10, in accordance with the present invention, is schematically illustrated. The illustrated portion of the vehicle 8 includes one axial pair of ground-engaging wheel assemblies 11A and 11B. Each wheel assembly 11A, 11B includes a road wheel which is rotatable about a respective wheel axes 12A, 12B. The wheel axes 12A and 12B are transverse to the vehicle's fore-to-aft axis 13. In the illustrated example, the wheel assemblies 11A and 11B are the vehicle's front pair of wheel assembles. Thus, the road wheels of the wheel assemblies 11A and 11B are the steerable wheels of the vehicle 8.

Only the single pair of wheel assemblies and associated suspension components are shown for the purposes of brevity and clarity. Specifically, the suspension components for the rear pair of wheel assemblies have similar structure and similar function as the suspension components for the front pair of wheel assemblies.

The wheel assemblies 11A and 11B are attached to the vehicle's chassis 14 (shown as fragments to permit clearer view of the present invention) via control arms 15A and 15B, respectively. Each control arm 15A, 15B has a pivot connection at each end to permit vertical relative movement between the respective wheel assembly 11A, 11B and the vehicle chassis 14 (see FIG. 1A). The chassis 14 is also connected to the control arms/wheel assemblies via spring assemblies (not shown) and shock absorber assemblies (not shown), which also permit vertical relative movement between the wheel assemblies 11A, 11B and the chassis. Thus, the relationship between the chassis 14 and each wheel assembly 11A, 11B is that of a sprung mass and an unsprung mass.

The system 10 (FIG. 1) includes a stabilizer bar 16 that extends transverse to the fore-to-aft axis 13 of the vehicle 8. The stabilizer bar 16 is also known as a roll control bar. The stabilizer bar 16 is rotationally mounted (e.g., via mounting brackets 17) to the chassis 14. Rotation of the stabilizer bar 16 relative to the chassis 14 is concurrent with swinging movements of the ends of the stabilizer bar.

One end (not visible in the Figures) of the stabilizer bar 16 is connected to the left (as viewed in FIG. 1) control arm 15A. The other end of the stabilizer bar 16 is connected to an upper (as viewed in FIG. 1) end of a hydraulic actuator 19 (see FIG. 1A). The other or lower end of the actuator 19 is connected to the right (as viewed in FIG. 1) control arm 15B.

Figures 1A, 7:
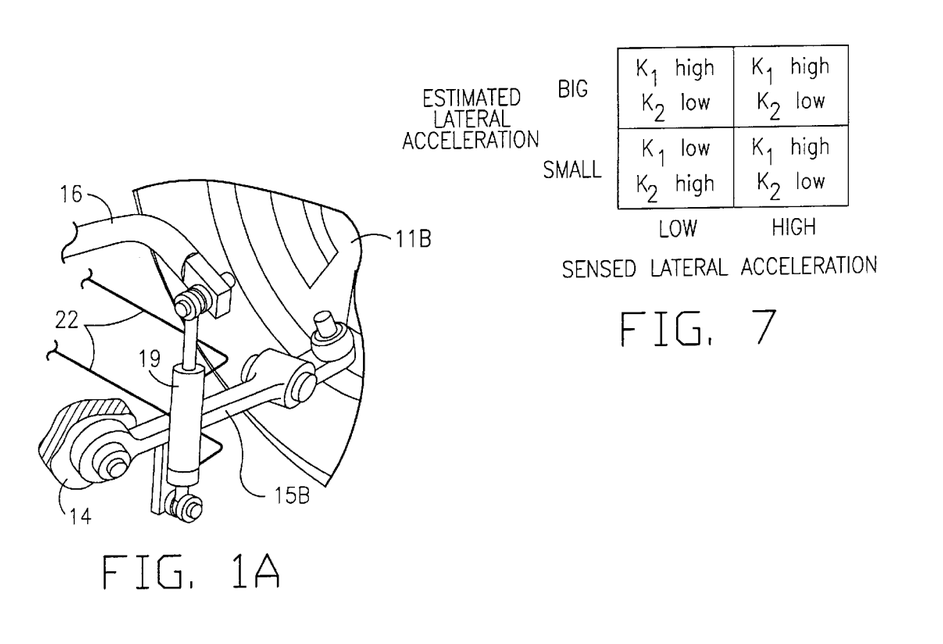
FIG. 1A is an enlarged view of a roll-control actuator shown in FIG. 1.
FIG. 7 is an illustration of the fuzzy base rule for the fuzzy logic controller shown in FIG. 2.

The actuator 19 is a double acting hydraulic actuator having a closed working cylinder mounting a reciprocating piston, as is known in the art. A pump 20 is a source of pressurized fluid for the actuator 19 and a reservoir 21 is a receptacle for fluid returning from the actuator 19. The flow of hydraulic fluid is through hydraulic lines 22. A valve system 23 controls the flow of hydraulic fluid between the pump/reservoir and the actuator 19, to cause or resist telescoping of the actuator.

The person of skill in the art will appreciate that the vehicle's other wheel assemblies (i.e., the rear pair of wheel assemblies, not shown) have a similar suspension structure arrangement. Specifically, the rear stabilizer bar (not shown) is similarly connected to the rear actuator (not shown). The valve system 23 is connected to control the flow of hydraulic fluid to the rear actuator in concert with the front actuator 19 (e.g., the front and rear actuators are connected in parallel).

During operation of the vehicle 8, turning/cornering of the vehicle urges the chassis 14 to roll about its fore-to-aft axis 13 due to the lateral acceleration experienced by the vehicle. The chassis roll is represented in FIG. 1 by the double-headed arrow. Chassis roll is normally manifested at the vehicle corners by compression of the outside corners (i.e., the chassis and the wheel assembly move closer together) and expansion of inside corners (i.e., the chassis and the wheel assembly move apart).

The stabilizer bar 16 acts to transfer the roll-induced force bearing on the stabilizer bar into a roll-resisting force acting on the chassis, as will be appreciated by a person skilled in the art. Specifically, the force delivered to one end of the stabilizer bar 16 due the chassis roll action causes the stabilizer bar to rotate at the chassis mounting brackets 17. Rotation of the stabilizer bar 16 causes the stabilizer bar to apply a force to the chassis 14 for resisting chassis roll. The rotation movement of the stabilizer bar 16 is dependent upon the amount of force applied by the actuator 19. Specifically, the actuator 19 can increase or decrease the roll damping or reduce roll gain dependent upon the flow of hydraulic fluid provided by the valve system 23.

A controller 24 of the suspension system 10 controls the valve system 23. The controller 24 provides a control signal 26 to the valve system 23 that is based upon determinations made within the controller. Specifically, the controller 24 monitors a compensated lateral acceleration signal 28 provided by a lateral acceleration apparatus 30 in accordance with the present invention and uses the information contained with the signal 28 to determine control of the valve system 23 (i.e., the compensated lateral acceleration signal 28 is used to determine a roll control command). The controller 24 controls the value system 23 and causes the actuator 19 to apply a variable force to the end of the stabilizer bar 16 to offset the roll force during the turning/cornering of the vehicle 8. The chassis 14 is thus inhibited from rolling about the for-to-aft axis 13 (e.g., the chassis is kept level).

The lateral acceleration apparatus 30 (FIG. 2) of the present invention includes a lateral acceleration sensor 36, which provides a sensed lateral acceleration signal 38, and a lateral acceleration estimator 40, which provides an estimated lateral acceleration signal 42. The lateral acceleration sensor 36 has any suitable structure for sensing lateral acceleration experienced by the vehicle 8, such as an accelerometer having an axis of sensitivity extending substantially perpendicular (i.e., lateral) to the fore-to-aft axis 13 of the vehicle 8. In the illustrated example, the lateral acceleration sensor 36 is located on the fore-to-aft axis 13.

Figure 2:
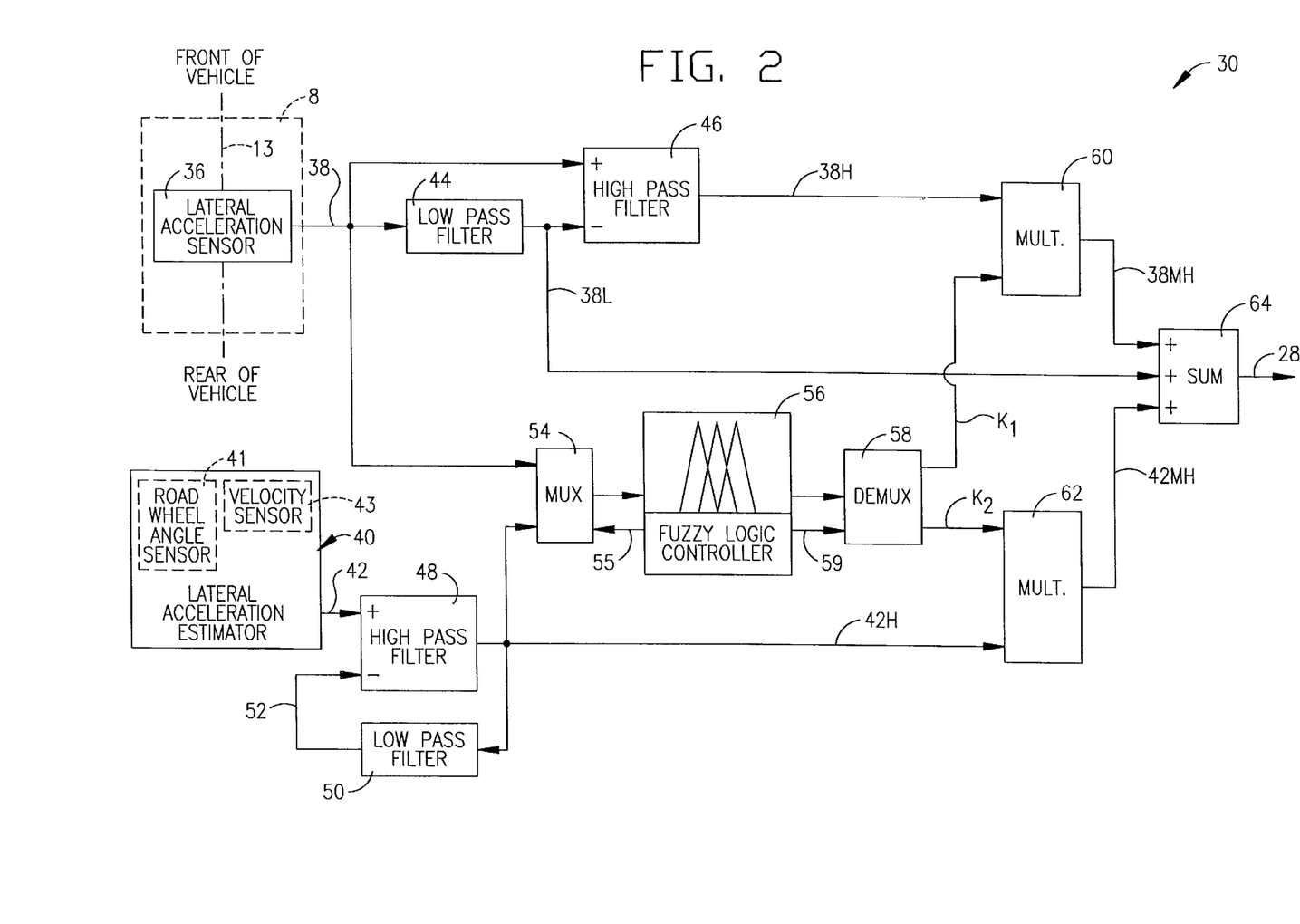
FIG. 2 is a schematic illustration of a lateral acceleration apparatus of the system shown in FIG. 1.

In a preferred embodiment, the sensed lateral acceleration signal 38 has both a magnitude component and a frequency component. Specifically, the signal 38 has a voltage magnitude value, which varies as a function of the magnitude of the sensed acceleration, and a frequency value, which varies as a function of the frequency of the sensed acceleration.

The lateral acceleration estimator 40 has any suitable structure for estimating lateral acceleration (i.e., structure that does not directly sense lateral acceleration). For example, the lateral acceleration estimator 40 includes a steerable road wheel angle sensor 41 and a vehicle forward velocity sensor 43. The angle sensing function of the road wheel angle sensor 41 is schematically shown in FIG. 1 as dash line extending to the wheel assembly 11A and senses the steering angle schematically represented by the angle A. The person of skill in the art will recognize that any suitable sensor may be used to sense the angle of the road wheels. For example, a steering shaft sensor may be used to sense the steering angle, which is, in turn, indicative of the angle of the road wheels.

The person of skill will recognize that the vehicle velocity sensor 43 may be any suitable sensor for sensing the velocity of the vehicle 8. For example, a transmission sensor may be used to sense the speed of a transmission drive-train member, which is, in turn, indicative of the velocity of the vehicle 8.

Sensory input from the road wheel angle sensor 41 and the vehicle forward velocity sensor 43 are utilized, along with other vehicle data such as wheel base length, by the estimator 40 to estimate a lateral acceleration value. An algorithm is used to determine the estimated lateral acceleration value. For example, any known algorithm for calculation of an estimated lateral acceleration value from road wheel angle, vehicle velocity, and wheelbase length can be used. The estimated acceleration value is provided as the estimated lateral acceleration signal 42. In a preferred embodiment, the estimated lateral acceleration signal 42 has a voltage magnitude component and a frequency component indicative of the estimated value.

Hereinafter, the lateral acceleration is referred to simply as acceleration. Accordingly, the compensated lateral acceleration signal 28 is referred to as the compensated acceleration signal 28. Similarly, the sensed lateral acceleration signal 38 is referred to simply as the sensed acceleration signal 38, and the estimated lateral acceleration signal 42 is referred to as the estimated acceleration signal 42.

The sensed acceleration signal 38 and the estimated acceleration signal 42 are analyzed and "blended", with the end result being the compensated acceleration signal 28. Specifically, the sensed acceleration signal 38 from the lateral acceleration sensor 36 is provided to a low-pass filter 44. The output of the low-pass filter 44 is a low frequency portion of the sensed acceleration signal 38, and is referred to as the low frequency portion 38L. The sensed acceleration signal 38 from the lateral acceleration sensor 36 is also provided to a non-inverting input of a high-pass filter 46 and the low frequency portion 38L from the low-pass filter 44 is provided to an inverting input of the high-pass filter 46. Within the high-pass filter 46, the low frequency portion 38L is subtracted from the sensed acceleration signal 38, and the output from the high-pass filter is referred to as a high frequency portion 38H of the sensed acceleration signal.

The estimated acceleration signal 42 from the lateral acceleration estimator 40 is provided to a non-inverting input of a high-pass filter 48. An output of the high-pass filter 48 is provided as an input to a low-pass filter 50. The low-pass filter output 52 is provided to an inverting input of the high-pass filter 48. Within the high-pass filter 48, the low-pass filter output 52 is subtracted from the estimated acceleration signal 42 from the lateral acceleration estimator 40. The output of the high-pass filter 48 is referred to as the filtered estimated acceleration signal 42H.

The sensed acceleration signal 38 from the lateral acceleration sensor 36 and the filtered estimated acceleration signal 42H from the high-pass filter 48 are also supplied to inputs of a multiplexer 54. A fuzzy logic controller 56 controls the multiplexer 54, via a signal 55, to selectively receive the sensed acceleration signal 38 and the filtered estimated acceleration signal 42H. The fuzzy logic controller 56 operates on the two input signals 38, 42H to generate two fuzzy variable values $K_1$ and $K_2$ using fuzzy logic rules.

Figure 3:
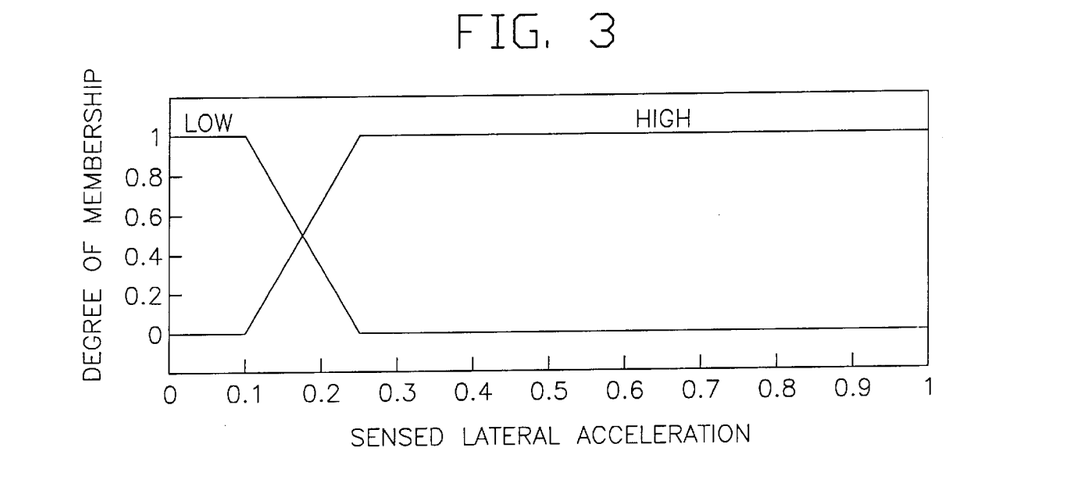
FIG. 3 is a graphical representation of membership functions of sensed lateral acceleration used by a fuzzy logic controller shown in FIG. 2.
Figure 4:
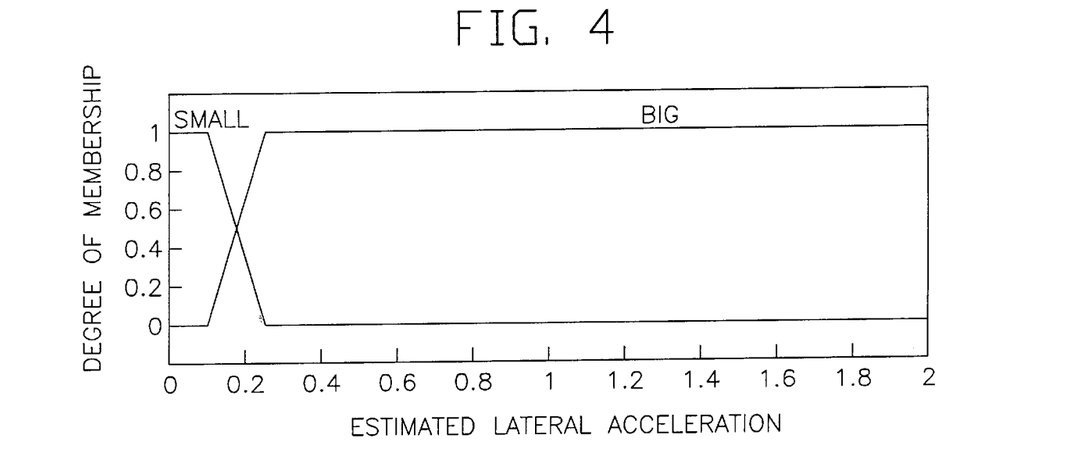
FIG. 4 is a graphical representation of membership functions for estimated lateral acceleration used by the fuzzy logic controller shown in FIG. 2.
Figure 5:
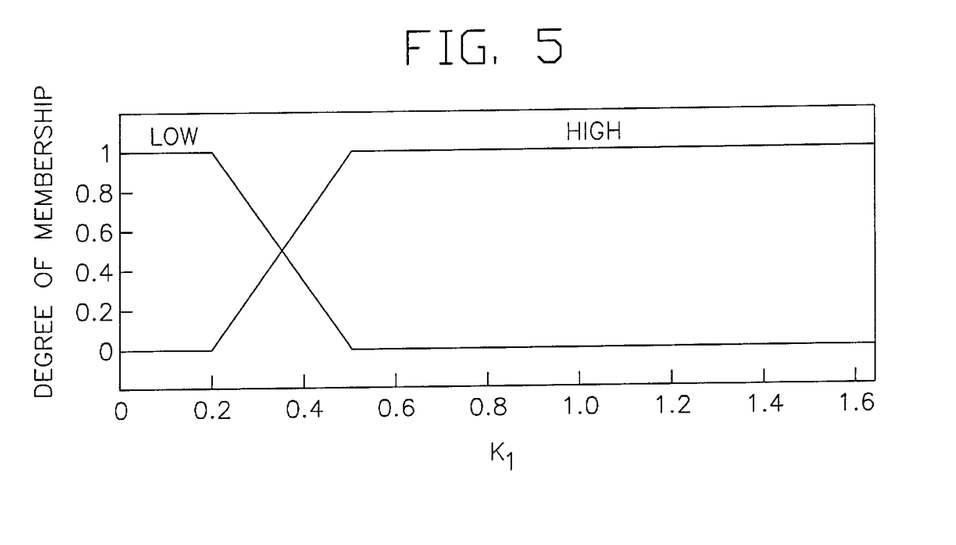
FIGS. 5 and 6 are graphical representations of membership functions for fuzzy variable values used by the fuzzy logic controller shown in FIG. 2.
Figure 6:
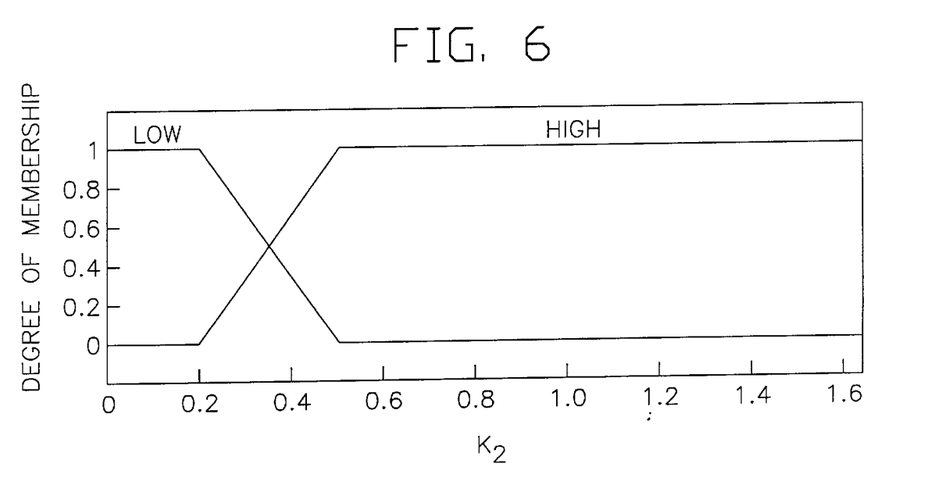

Specifically, as shown in FIG. 3, the sensed acceleration has two membership functions for which the degree of membership varies dependent upon the magnitude value of the sensed acceleration signal 38. Similarly as shown in FIG. 4, the estimated acceleration has two membership functions for which the degree of membership varies dependent upon the magnitude value of the filtered estimated acceleration signal 42H. The fuzzy variable values $K_1$ and $K_2$ each have two membership functions (FIGS. 5 and 6). The degree of membership for each of the fuzzy variable values $K_1$, $K_2$ is functionally related to the magnitude of the respective fuzzy variable values.

The relationship between the sensed acceleration and the estimated acceleration to the two fuzzy variable values $K_1$ and $K_2$ will be appreciated by referring to FIG. 7, which illustrates the rule base for the fuzzy logic controller 56. The rule base includes the following rules:

1. If the magnitude value of the sensed acceleration signal 38 is low and the magnitude value of the filtered estimated acceleration signal 42H is small, then $K_1$ is low and $K_2$ is high.
2. If the magnitude value of the sensed acceleration signal 38 is high and the magnitude value of the filtered estimated acceleration signal 42H is small, then $K_1$ is high and $K_2$ is low.
3. If the magnitude value of the sensed acceleration signal 38 is low and the magnitude value of the filtered estimated acceleration signal 42H is big, then $K_1$ is high and $K_2$ is low.
4. If the magnitude value of the sensed acceleration signal 38 is high and the magnitude value of the filtered estimated acceleration signal 42H is big, then $K_1$ is high and $K_2$ is low.

The fuzzy logic controller 56 outputs the two fuzzy variable values $K_1$, $K_2$ to a demultiplexer 58. The first fuzzy variable value $K_1$ is provided, via the demultiplexer 58, under control of the fuzzy logic controller 56 via a signal 59, as a first input to a first multiplier 60. The high frequency portion 38H of the sensed acceleration signal 38 from the high-pass filter 46 is provided as a second input to the first multiplier 60. The first multiplier 60 multiplies the high frequency portion 38H of the sensed acceleration signal by the first fuzzy variable value $K_1$, and provides the result as a first multiplier output. It will be appreciated by a person of ordinary skill in the art that the first fuzzy variable value $K_1$ is a weighting value and it is used to "weight" the high frequency portion 38H of the sensed acceleration signal 38. It will further be appreciated that the first multiplier 60 acts as an amplifier, with the first fuzzy variable $K_1$, being used as a gain value. The first multiplier output is referred to as the modified high frequency portion 38MH of the sensed acceleration signal.

The demultiplexer 58, under control of the fuzzy logic controller 56 via the signal 59, provides the second fuzzy variable value $K_2$ as a first input to a second multiplier 62. The filtered estimated acceleration signal 42H is provided to the second multiplier 62 as a second input. The second multiplier 62 multiplies the filtered estimated acceleration signal 42H by the second fuzzy variable value $K_2$, and provides the result as a second multiplier output. It will be appreciated by a person of ordinary skill in the art that the second fuzzy variable value $K_2$ is a weighting value and it is used to "weight" the filtered estimated acceleration signal 42H, and further that the second multiplier 62 acts as an amplifier. The second multiplier output is referred to as the modified estimated acceleration signal 42MH.

The modified high frequency portion 38MH of the sensed acceleration signal 38 and the low frequency portion 38L of the sensed acceleration signal, and the modified estimated acceleration signal 42MH are all provided to a summation device 64. It will be appreciated by a person of ordinary skill in the art that a full "weight" is accorded to the low frequency portion 38L of the sensed acceleration signal 38. The summation device 64 adds its three inputs and provides the result as an output that is the compensated acceleration signal 28.

When the value of the first fuzzy variable value $K_1$ is zero, the contribution to the compensated acceleration signal 28 by the high frequency portion 38H is zero. Similarly, when the value of the second fuzzy variable value $K_2$ is zero, the contribution by the filtered estimated acceleration signal 42H is zero. Accordingly, the compensated acceleration signal 28 is represented by the following equation:

$$N_{COMP}=(N_{SEN}-N_{SEN\,LOW})K_1+(N_{EST\,HIGH})K_2+N_{SEN\,LOW}$$

wherein:

$N_{COMP}$=the compensated acceleration signal 28;

$N_{SEN}$=the sensed acceleration signal 38;

$N_{SEN\,LOW}$=the low frequency portion 38L;

$N_{EST\,HIGH}$=the filtered estimated acceleration signal 42H;

$K_1$=the first fuzzy variable value; and $K_2$=the second fuzzy variable value.

In a steady-state condition, the compensated acceleration signal 28 has little or no high frequency noise interference associated with the sensed acceleration signal 38 as a result of the low-pass filtering and the full weight given to the low frequency portion 38L at the summation device 64. The high-pass filtering of the sensed acceleration signal 38 and the estimated acceleration signal 42 gives phase lead such that the apparatus 30 acts somewhat like an "anticipator" to an input.

During a quick steering maneuver, the compensated acceleration signal 28 is initially provided based upon the estimated acceleration signal 42 because of the filtering processes, the fuzzy logic rule base, and the blending process provided by the summation device 64. If the vehicle stays in the turn (i.e., the sensed lateral acceleration increases), the second fuzzy variable value $K_2$ goes to zero and the modified estimated acceleration signal 42MH no longer contributes to the compensated acceleration signal 28. Thus, when the second fuzzy variable value $K_2$ is at zero, the compensated acceleration signal 28 is provided entirely based upon the sensed acceleration signal 38, as provided by the low frequency portion 38L and the modified high frequency portion 38MH.

From the above description of the invention, those skilled in the art will perceive improvements, changes and modifications. For example, it will be appreciated by a person of ordinary skill in the art that the present invention is applicable to other types of suspension systems. An example of such a different suspension system is a system that includes a hydraulic actuator at each corner of the vehicle. The compensated lateral acceleration signal would be used to determine control for each of the actuators (i.e., corner control). Another example of a different suspension system is a system that has two actuators for each stabilizer bar. One of the actuators is connected to the first end of the bar and the second actuator is connected to the second end of the bar.

Also, it will be appreciated by a person of ordinary skill in the art that as an alternative to maintaining the chassis level, the sufficient force can be applied to the torsion bar to cause the chassis to be tilted toward the inward side of a turn to provide a sensation of "banking" around the turn. Such improvements, changes and modifications within the skill of the art are intended to be covered by the appended claims.

Having described the invention, the following is claimed:

1. An apparatus for providing a weighted signal indicative of acceleration of an object, said apparatus comprising:

means for providing a first acceleration signal indicative of object acceleration;

means for calculating a weighting factor using said first signal; and means for multiplying said first signal by said weighting factor to provide said weighted signal.

2. An apparatus as set forth in claim 1, wherein said means for providing a weighting factor includes fuzzy logic control means for analyzing said first signal using fuzzy logic and for providing a fuzzy variable value as said weighting factor.

3. An apparatus as set forth in claim 1, wherein said means for providing said first signal includes an acceleration sensor for sensing object acceleration and for providing said first signal as indicative of a value the sensed acceleration.

4. An apparatus as set forth in claim 1, wherein said means for providing said first signal includes means for estimating object acceleration and for providing said first signal as indicative of a value of the estimated acceleration.

5. An apparatus for providing an output signal indicative of a vehicle operating parameter, said apparatus comprising:
sensor means for sensing the operating parameter and for providing a first operating parameter signal indicative of a value of the operating parameter;
estimator means for estimating the operating parameter and for providing a second operating parameter signal indicative of an estimated value of the operating parameter; and
means for processing said first and second signals to provide said output signal;
said means for processing including means for determining first and second weighting factors for said first and second signals, respectively, using at least portions of said first and second signals, means for modifying said first and second signals using said first and second weighting factors to provide first and second modified signals, and means for combining said first and second modified signals to provide said output signal.

6. An apparatus as set forth in claim 5, wherein said means for determining first and second weighting factors includes fuzzy logic control means for analyzing said at least portions of said first and second signals using fuzzy logic and for providing first and second fuzzy variable values as said first and second weighting factors respectively, said means for modifying said first and second signals includes means for multiplying at least a portion of said first signal and at least a portion of said second signal by said first and second fuzzy variable values, respectively.

7. An apparatus as set forth in claim 5, wherein said means for processing includes means for separating said first signal into first and second portions, said means for modifying said first and second signals includes means for multiplying one of said first and second portions of said first signal by said first weighting factor.

8. An apparatus as set forth in claim 7, wherein said means for separating said first signal into first and second portions includes frequency filter means for separating said first signal into said first and second portions, with the first portion having high frequencies and said second portion having low frequencies, said means for multiplying one of said first and second portions of said first signal by said first weighting factor includes means for multiplying said first portion of said first signal by said first weighting factor.

9. An apparatus as set forth in claim 5, wherein said means for determining first and second weighting factors includes fuzzy logic control means for analyzing at least portions of said first and second signals using fuzzy logic and for providing fuzzy variable values based upon said analysis.

10. An apparatus as set forth in claim 9, wherein said means for modifying said first and second signals includes means for modifying said first and second signals using said fuzzy variable values.

11. An apparatus as set forth in claim 5, wherein said means for processing includes first frequency filter means for separating said first signal into a first portion containing high frequencies and a second portion containing low frequencies, and second frequency filter means for filtering out a certain range of frequencies in said second signal; said means for determining first and second weighting factors includes fuzzy logic control means for analyzing said first signal and said filtered second signal and for providing first and second fuzzy variable values; said means for modifying said first and second signals includes means for multiplying said first portion of said first signal by said first fuzzy variable value to provide a weighted first portion of said first signal, and means for multiplying said filtered second signal by said second fuzzy variable value to provide a weighted, filtered second signal; and said means for combining includes means for adding said weighted first portion of said first signal, said second portion of said first signal, and said filtered, weighted second signal.

12. An apparatus as set forth in claim 5, wherein said output signal is indicative of acceleration of a vehicle component, said sensor means includes means for sensing acceleration of the vehicle component and for providing said first signal as indicative of a value of the sensed acceleration, and said estimator means includes means for estimating acceleration of the vehicle component and for providing said second signal as indicative of a value of the estimated acceleration.

13. An apparatus as set forth in claim 12, wherein said means for estimating acceleration includes means for calculating a value indicative of acceleration from at least one vehicle operating parameter other than sensed acceleration.

14. An active vehicle suspension system for controlling roll of a chassis of a vehicle, said system comprising:
force application means for applying force to said chassis;
control means for controlling said force application means in response to at least one operating parameter signal indicative of a vehicle condition; and
means for providing an acceleration signal to said control means as an operating parameter signal, said means for providing an acceleration signal comprising:
(i) means for providing a first acceleration signal indicative of acceleration;
(ii) means for calculating a weighting factor using said first signal;
(iii) means for multiplying said first signal by said weighting factor to provide a weighted signal; and
(iv) means for unitizing said weighted signal as a component to provide said acceleration signal.

15. A system as set forth in claim 14, wherein said means for providing a weighting factor includes fuzzy logic control means for analyzing said first signal using fuzzy logic and for providing a fuzzy variable value as said weighting factor.

16. A system as set forth in claim 14, wherein said means for providing said first signal includes an acceleration sensor for sensing acceleration and for providing said first signal as indicative of a value of the sensed acceleration.

17. A system as set forth in claim 14, wherein said means for providing said first signal includes means for estimating object acceleration and for providing said first signal as indicative of a value of the estimated acceleration.

18. An active vehicle suspension system for controlling roll of a chassis of a vehicle, said system comprising:
force application means for applying force to the chassis;
control means for controlling said force application means in response to at least one operating parameter signal indicative of a vehicle condition; and
means for providing said operating parameter signal to said control means, said means for providing comprising:

(i) sensor means for sensing the operating parameter and for providing a first signal indicative of a value of the operating parameter;

(ii) estimator means for estimating the operating parameter and for providing a second signal indicative of an estimated value of the operating parameter; and (iii) means for processing said first and second signals to provide said operating parameter signal, said means for processing including means for determining first and second weighting factors for said first and second signals, respectively, using at least portions of said first and second signals, means for modifying said first and second signals using said first and second weighting factors to provide first and second modified signals, and means for combining said first and second modified signals.

19. A system as set forth in claim 18, wherein said means for determining first and second weighting factors includes fuzzy logic control means for analyzing said at least portions of said first and second signals using fuzzy logic and for providing first and second fuzzy variable values as said first and second weighting factors, respectively, said means for modifying said first and second signals includes means for multiplying at least a portion of said first signal and at least a portion of said second signal by said first and second fuzzy variable values, respectively.

20. A system as set forth in claim 18, wherein said means for determining first and second weighting factors includes fuzzy logic control means for analyzing said first and second signals using fuzzy logic and for providing fuzzy variable values based upon said analysis.

21. A system as set forth in claim 18, wherein said operating parameter is acceleration, said sensor means includes means for sensing acceleration and for providing said first signal as indicative of a value of the sensed acceleration, and said estimator means includes means for estimating acceleration and for providing said second signal as indicative of a value of the estimated acceleration.

22. A vehicle suspension control apparatus having a controllable actuator for controlling at least one suspension characteristic in response to a control signal, said apparatus comprising:

means for sensing lateral acceleration of said vehicle and providing a sensed lateral acceleration signal indicative thereof;

means for estimating lateral acceleration of said vehicle and providing an estimated lateral acceleration signal indicative thereof; and means for blending said sensed lateral acceleration signal and said estimated lateral acceleration signal to provide said control signal so that said control signal is initially responsive to said estimated lateral acceleration signal and subsequently responsive to said sensed lateral acceleration signal.

23. The apparatus of claim 22, wherein said means for blending includes fuzzy logic controller means for controlling blending of said sensed lateral acceleration signal and said estimated lateral acceleration signal by following a fuzzy rule base.

24. The apparatus of claim 23, wherein said means for blending further includes amplifier means for amplify ing said sensed lateral acceleration signal and said estimated lateral acceleration signal and summing means for summing said amplified signals, said fuzzy logic controller means controlling gain of said amplifier means in response to said fuzzy rule base.

25. A method for providing a weighted signal indicative of acceleration of an object, said method comprising:

providing a first acceleration signal indicative of object acceleration;

calculating a weighting factor using the first signal; and multiplying the first signal by the weighting factor to provide the weighted signal.

26. A method of providing an output signal indicative of a vehicle operating parameter, said apparatus comprising:

sensing the operating parameter and providing a first operating parameter signal indicative of a value of the operating parameter;

estimating the operating parameter and providing a second operating parameter signal indicative of an estimated value of the operating parameter; and processing said first and second signals to provide said output signal, including determining first and second weighting factors for the first and second signals, respectively, using at least portions of said first and second signals, modifying the first and second signals using the first and second weighting factors to provide first and second modified signals, and combining the first and second modified signals.

27. A method as set forth in claim 26, wherein the operating parameter is acceleration of a vehicle component and the output signal is indicative of acceleration of the vehicle component, said step of sensing includes sensing acceleration of the vehicle component and said step of estimating includes estimating acceleration of the vehicle component.

* * * * *